(12) United States Patent
Kohei

(10) Patent No.: US 7,930,641 B2
(45) Date of Patent: Apr. 19, 2011

(54) ICON UTILIZATION METHOD, ICON UTILIZATION APPARATUS, ICON UTILIZATION CONTROL PROGRAM, AND PROGRAM STORAGE MEDIUM

(75) Inventor: Sugawara Kohei, Kanagawa (JP)

(73) Assignee: Sangikyo Corporation, Kanagawa (JP)

( * ) Notice: Subject to any disclaimer, the term of this patent is extended or adjusted under 35 U.S.C. 154(b) by 737 days.

(21) Appl. No.: 11/914,124

(22) PCT Filed: Jun. 15, 2007

(86) PCT No.: PCT/JP2007/062128

§ 371 (c)(1),
(2), (4) Date: Nov. 9, 2007

(87) PCT Pub. No.: WO2008/152732

PCT Pub. Date: Dec. 18, 2008

(65) Prior Publication Data

US 2009/0313565 A1    Dec. 17, 2009

(30) Foreign Application Priority Data

Jun. 12, 2007   (JP) ................................ 2007-154633

(51) Int. Cl.
  *G06F 3/048*   (2006.01)
(52) U.S. Cl. .................... 715/764; 715/765; 715/766
(58) Field of Classification Search .......... 715/700–867, 715/961–978
See application file for complete search history.

(56) References Cited

U.S. PATENT DOCUMENTS

| 5,673,401 | A  | * | 9/1997  | Volk et al. ............... 725/139 |
| 5,807,174 | A  |   | 9/1998  | Fukuhara et al. |
| 6,469,722 | B1 | * | 10/2002 | Kinoe et al. ............. 715/837 |
| 7,246,329 | B1 | * | 7/2007  | Miura et al. ............. 715/810 |
| 7,543,261 | B2 | * | 6/2009  | Lindberg et al. ......... 716/11 |
| 7,761,801 | B2 | * | 7/2010  | Park ........................ 715/764 |

FOREIGN PATENT DOCUMENTS

| JP | 63-244226   | 10/1988 |
| JP | 02-239314   | 9/1990  |
| JP | 4-54630     | 2/1992  |
| JP | 06-274304   | 9/1994  |
| JP | 07-064749   | 3/1995  |
| JP | 9-192353    | 7/1997  |
| JP | 2762296     | 3/1998  |
| JP | 2005-209218 | 8/2005  |

* cited by examiner

*Primary Examiner* — Dennis-Doon Chow
*Assistant Examiner* — William Titcomb
(74) *Attorney, Agent, or Firm* — Foley & Lardner LLP

(57) ABSTRACT

An icon representing a target object is constituted by a pin main body, which comprises a head and a needle, and a shadow of the pin main body. The display and control of the target object are changed by changing display states of the pin main body and the shadow. For example, if a decision button is depressed and released with a cursor pointer placed on the head, the target object is displayed on the screen of a display. When the target object is displayed on the screen and is in an unexecuted state, the needle is displayed so that it has stuck halfway. When the target object is being executed, the needle is displayed so that it has stuck deeply. When the target object and the icon are in a movable state, the needle is displayed so that it is floating. When the target object is in an enlargeable or reducible state, the head is displayed so that it is rotating.

14 Claims, 12 Drawing Sheets

ICON DIAGRAM

|  | STATE |
|---|---|
| PIN MAIN BODY | • FLOATING STATE<br>• HALFWAY STICKING AND FIXING STATE<br>• HALFWAY STICKING AND ROTATING STATE<br>• DEEPLY STICKING STATE |
| SHADOW OF PIN | • FLOATING STATE<br>• HALFWAY STICKING AND FIXING STATE<br>• DEEPLY STICKING STATE<br>• HIDDEN-BUTTON DISPLAYING STATE |

FIG.3

| STATE OF PIN MAIN BODY | | | STATES OF PIN AND SHADOW | | | |
|---|---|---|---|---|---|---|
| | | | FLOATING STATE | HALFWAY STICKING STATE | DEEPLY STICKING STATE | HIDDEN-BUTTON DISPLAYING STATE |
| FLOATING STATE | | | PIN AND TARGET OBJECT ARE IN A MOVABLE STATE | --- | --- | --- |
| HALFWAY STICKING STATE | FIXING STATE | | --- | PIN AND TARGET OBJECT STAY AT THE PLACE | --- | HIDDEN BUTTONS ARE DISPLAYED AND ARE IN A SELECTABLE |
| | ROTAT -ING STATE | | --- | TARGET OBJECT IS BEING ENLARGED OR REDUCED | --- | --- |
| DEEPLY STICKING STATE | | | --- | --- | DISPLAY OF TARGET OBJECT IS BEING EXECUTED | --- |

FIG. 4

| State of Pin Main Body | Operation of Cursor Pointer ||||||
|---|---|---|---|---|---|---|
| | With cursor pointer placed on the upper portion (head) of pin, depress decision button | With cursor pointer placed on the lower portion (needle) of pin, depress decision button | Release decision button | Move cursor pointer | With cursor pointer placed on the shadow of pin, depress decision button | With cursor pointer placed on a button hidden within the shadow of pin, depress decision button |
| Floating state | — | State of pin main body goes to a deeply sticking state | State of pin main body goes to a halfway sticking state | Display position of pin moves following cursor pointer | — | — |
| Halfway sticking and fixing state | State of pin main body goes to a deeply sticking state | — | State of pin main body goes to a floating state | — | — | — |
| Halfway sticking and rotating state | — | — | — | — | — | — |
| Deeply sticking state | — | — | Target object is displayed and state of pin main body goes to a halfway sticking state of FIG. 5 | — | — | — |
| Hidden-button displaying state | — | — | — | — | — | — |

FIG.5

| | | OPERATION OF CURSOR POINTER | | | | | |
|---|---|---|---|---|---|---|---|
| | | WITH CURSOR POINTER PLACED ON THE UPPER PORTION (HEAD) OF PIN, DEPRESS DECISION BUTTON | WITH CURSOR POINTER PLACED ON THE LOWER PORTION (NEEDLE) OF PIN, DEPRESS DECISION BUTTON | RELEASE DECISION BUTTON | MOVE CURSOR POINTER | WITH CURSOR POINTER PLACED ON THE SHADOW OF PIN, DEPRESS DECISION BUTTON | WITH CURSOR POINTER PLACED ON A BUTTON HIDDEN WITHIN THE SHADOW OF PIN, DEPRESS DECISION BUTTON |
| STATE OF PIN MAIN BODY | FLOATING STATE | — — — | — — — | STATE OF PIN MAIN BODY GOES TO A HALFWAY STICKING STATE | DISPLAY POSITION OF PIN MOVES FOLLOWING CURSOR POINTER | — — — | — — — |
| | HALFWAY STICKING AND FIXING STATE | STATE OF PIN MAIN BODY GOES TO A DEEPLY STICKING STATE | STATE OF PIN MAIN BODY GOES TO A FLOATING STATE | — — — | — — — | ENLARGE SHADOW TO DISPLAY SELECTION BUTTONS WITHIN SHADOW, AND PIN MAIN BODY GOES TO A HIDDEN-BUTTON DISPLAY STATE | — — — |
| | HALFWAY STICKING AND ROTATING STATE | ENLARGE OR REDUCE DISPLAY OF TARGET OBJECT (WHEN A DISPLAY SIZE IS LESS THAN A THRESHOLD VALUE, TARGET OBJECT IS SET TO A NON-DISPLAY STATE, AND PIN MAIN BODY GOES TO A HALFWAY STICKING STATE OF FIG. 4) | — — — | DECIDE ENLARGEMENT OR REDUCTION THROUGH A TOGGLE SWITCH, AND PIN MAIN BODY GOES TO A HALFWAY STICKING STATE | — — — | — — — | — — — |
| | DEEPLY STICKING STATE | — — — | — — — | — — — | — — — | — — — | — — — |
| | HIDDEN-BUTTON DISPLAYING STATE | — — — | — — — | — — — | — — — | REDUCE SHADOW TO HIDDEN SELECTION BUTTONS WITHIN SHADOW, AND PIN MAIN BODY GOES TO A HALFWAY STICKING STATE | FUNCTION OF A HIDDEN BUTTON IS EXECUTED |

FIG.12
(A) NUMBER OF DISPLAY ICONS OF PRIOR ART
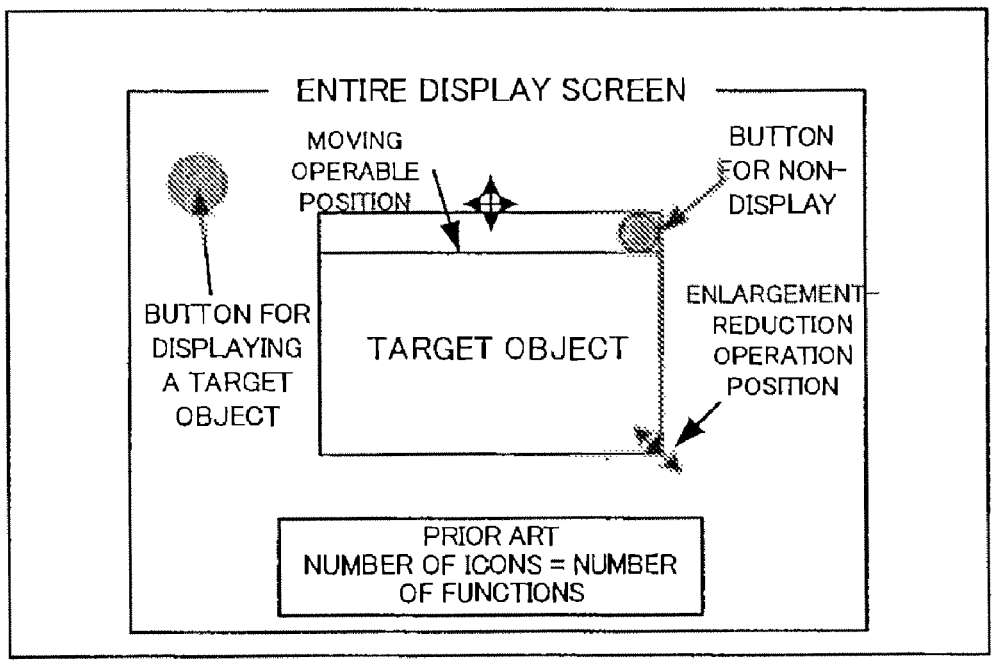
(B) NUMBER OF DISPLAY ICONS OF PRESENT INVENTION
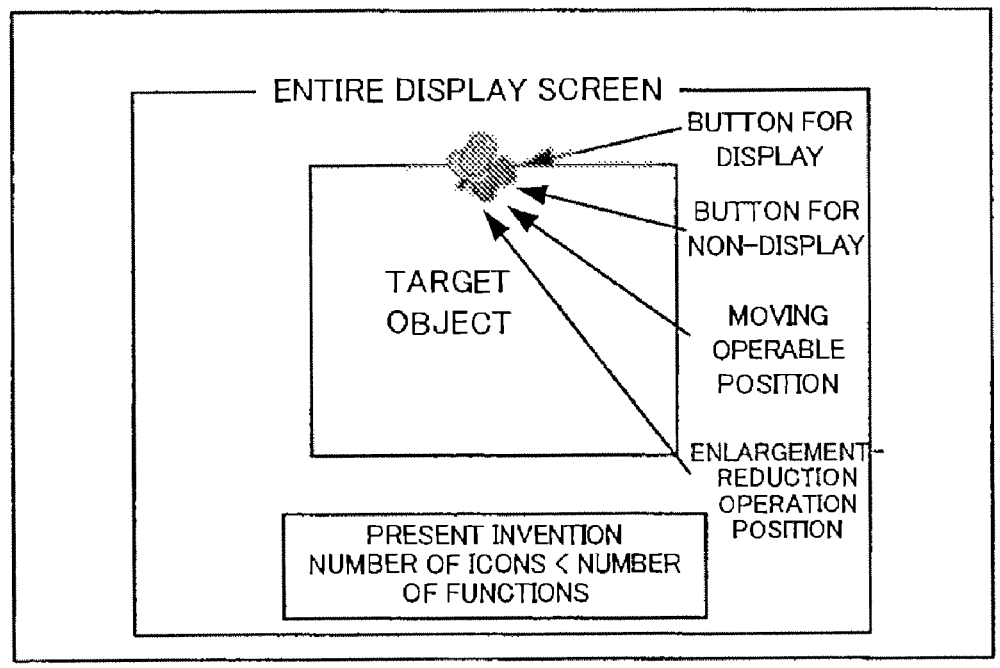

FIG.13

| PIN | SCREW | AIRPLANE | BALLOON | SUCKING DISK WITH A BULGING CENTRAL PORTION | GOLR BALL |
|---|---|---|---|---|---|
| ROTATE | ROTATE | FLY | FLOAT | FALL OUT | FLOAT |
| STICK | STICK | LAND | LAND | ADHERE | LAND |
| STICK DEEPLY | STICK DEEPLY | EXPLODE | DEFLATE | CAVE IN | SINK |
| ROTATE | ROTATE | REVOLVE | REVOLVE | ROTATE | ROTATE |
| SHADOW | SHADOW | SHADOW | SHADOW | SHADOW | SHADOW |

ICON UTILIZATION METHOD, ICON UTILIZATION APPARATUS, ICON UTILIZATION CONTROL PROGRAM, AND PROGRAM STORAGE MEDIUM

CROSS-REFERENCE TO RELATED PATENT APPLICATIONS

This application claims benefit from Japan Priority Application 154633-2007, filed Jun. 12, 2007 entitled "Icon Utilization Method, Icon Utilization Apparatus, Icon Utilization Control Program, and Program Storage Medium" is incorporated herein by reference in its entirety. This application claims priority from PCT/JP2007/062128, filed Jun. 15, 2007 entitled "Icon Utilization Method, Icon Utilization Apparatus, Icon Utilization Control Program, and Program Storage Medium" incorporated herein by reference in its entirety.

FIELD OF THE INVENTION

The present invention relates to an icon utilization method, an icon utilization apparatus, an icon utilization control program, and a program storage medium, and more particularly to an icon utilization method, an icon utilization apparatus, an icon utilization control program, and a program storage medium that realize a man-machine interface technique which improves the user operability and friendliness on the screen of a display when users utilize application software.

DESCRIPTION OF THE RELATED ART

The use of personal computers is now spreading steadily so that within an enterprise or a family, one person possesses one personal computer. There are a wide variety of convenient computer applications, but in the case where an operation manual becomes bulky because of an increase in the number of functions, and a personal computer needs to be used to a high degree, higher skill is required as a computer application becomes more convenient.

In addition, in the case where electronic documents or contents of a home page have to be understood in detail, an interface on the screen alone causes inconvenience and therefore not a few persons print them on paper and take the printed matter in his hands to confirm it.

With a reduction in the size of various sorts of electronic equipment such as cellular phones as well as personal computers, the simplification of a man-machine interface, which appears when a human requires operation of electronic equipment, is an important consideration from the viewpoint of future technical advancement.

For example, as described in an image management apparatus, an image management method, and a computer readable storage medium disclosed in Japanese patent laid-open publication No. 2000-348058, ordinary electronic equipment is provided with a display screen to realize a simplified man-machine interface. On the display screen, icons are displayed as bitmap images for respectively specifying applications each realizing a function. By performing a particular operation (e.g., double clicking of a mouse button) on any of the icons, a desired particular application is activated.

[Patent Document 1] Japanese Patent Laid-Open Publication No. 2000-348058 (pp. 3-4)

DISCLOSURE OF THE INVENTION

Problems to be Solved by the Invention

However, the conventional method for realizing a man-machine interface by icons has the following problems, so the method is not always convenient to use.

(1) It is necessary to dispose on the screen of a display a number of different icons that corresponds to the number of necessary functions. With an increase in the number of necessary functions, all of the necessary functions cannot be displayed on the screen at a time. As a result, the number of icons will be increased for displaying hierarchized screens in several stages.

(2) Even when a function is not being used by a user, it is necessary to allocate a screen display region for an icon corresponding to that function. This will result in a listing of icons for necessary functions being ruined.

(3) For a user who utilizes a function, the name of an icon for specifying that function must be displayed so that it is easily understandable. However, names of icons are not necessarily displayed so that they are easy to understand.

(4) Like small portable equipment, in the case where a low-resolution screen is employed to display icons, icons that can be disposed are limited in number. Even if icons are displayed on hierarchized screens, the number of functions that can be selected by a user is limited by the depth of the hierarchy.

(5) Generally, the operation of enlarging or reducing a target object displayed on the display screen cannot be performed with a single icon and requires a complicated cursor pointer operation.

The present invention has been made in view of the problems described above. Accordingly, it is an object of the present invention to provide an icon utilization method, an icon utilization apparatus, an icon utilization control program, and a program storage medium which are capable of intuitively understanding target functions and reducing an icon (button) display occupation region and user load, when operating a man-machine interface, by utilizing icons which each represent a function (target object) as a bitmap image, in applications on various types of electronic equipment as well as computer applications.

Means For Solving the Problems

In order to solve the above problems, an icon utilization method, an icon utilization apparatus, an icon utilization control program, and a program storage medium according to the present invention employs the following featured structures.

(1) A method of utilizing an icon representing a target object to display and control said target object on a display screen, comprising the steps of:

constituting said icon by a pin main body, which comprises a head and a needle, and a shadow of said pin main body; and changing the display and control of said target object represented by said icon by changing display states of said pin main body and said shadow.

(2) The method as set forth in claim 1, wherein, when said target object is in a non-display state on said display screen, said target object is displayed on said display screen by depressing a decision button with a cursor pointer placed on the head of said pin main body of said icon, and then releasing said decision button.

(3) The method as set forth in claim 1, wherein, when said target object is in a display state or non-display state on said display screen, a display position of said target object and/or a display position of said icon is moved to an arbitrary position by depressing and dragging a decision button to said arbitrary position with a cursor pointer placed on the needle of said pin main body of said icon, and then releasing said decision button.

(4) The method as set forth in claim 1, wherein, when said target object is in a display state on said display screen, a screen display size of said target object is enlarged or reduced by depressing a decision button with a cursor pointer placed on the head of said pin main body of said icon, and then the screen display size of said target object is decided by releasing said decision button with said cursor pointer placed on the head of said pin main body.

(5) The method as set forth in claim 1, wherein, when said target object is in a display state on said display screen, enlargement and reduction of a screen display size of said target object are switched alternately by releasing a decision button with a cursor pointer placed on the head of said pin main body of said icon.

(6) The method as set forth in claim 1, wherein, when said target object is in a display state on said display screen, said target object is set to a non-display state when a screen display size of said target object is reduced to a size smaller than a predetermined threshold value.

(7) The method as set forth in claim 1, wherein, when said target object is in a display state on said display screen, a size of said shadow is enlarged to a suitable display size by depressing a decision button with a cursor pointer placed on said shadow of said icon, whereby one or a plurality of buttons stored within said shadow are displayed within said shadow and made effective.

(8) The method as set forth in claim 7, wherein, when said target object is in a display state on said display screen, and said one or plurality of buttons are displayed within said shadow and made effective, the decision button is depressed with the cursor pointer placed on any of said buttons, whereby a function corresponding to the button selected is carried out.

(9) The method as set forth in claim 7 or 8, wherein, when said target object is in a display state on said display screen, and said one or plurality of buttons are displayed within said shadow and made effective, the decision button is depressed with the cursor pointer placed on said shadow of said icon, whereby said one or plurality of buttons displayed within said shadow are switched over to a non-display state and made ineffective, and a display size of said shadow is reduced to an initial display size.

(10) The method as set forth in claim 1, wherein
when said target object is displayed on said display screen and is in an unexecuted state, said needle of said icon is displayed so that said needle has stuck halfway;
when said target object is being executed, said needle of said icon is displayed so that said needle has stuck deeply;
when said target object and said icon are in a movable state, said needle of said icon is displayed so that said needle is floating; and
when said target object is in an enlargeable or reducible state, said head of said icon is displayed so that said head is rotating.

(11) An apparatus for utilizing an icon representing a target object to display and control said target object on a display screen, wherein
said icon is constituted by a pin main body, which comprises a head and a needle, and a shadow of said pin main body; and
the display and control of said target object represented by said icon are changed by changing display states of said pin main body and said shadow.

(12) A program for carrying out by a computer the method as set forth in any one of claims 1 to 10.

(13) A computer readable storage medium storing the program as set forth in claim 12.

(14) A method of utilizing an icon representing a target object to display and control said target object on a display screen, comprising the steps of:

constituting said icon by a particular shape and icons expressed in different display states; and
changing the display and control of said target object represented by said icon by changing said particular shape and said display state.

ADVANTAGES OF THE INVENTION

The icon utilization method, the icon utilization apparatus, the icon utilization control program, and the program storage medium of the present invention are able to obtain the following advantages:

(1) The following functions can be represented with only a single icon.
 (a) Display and non-display of a target object
 (b) Movement of a target object
 (c) Enlargement and reduction of a target object
 (d) Effectiveness and ineffectiveness of one or a plurality of buttons stored within a shadow (2) Each of the aforementioned operations (a) through (d) can be realized with only the minimum movement of a cursor pointer, a decision button, and dragging.

(3) It is possible for users to intuitively understand necessary functions and perform necessary operations, without displaying the names of the necessary functions.

(4) Even in the case where the present invention is applied to the operation within a small display screen such as the display screen of a cellular phone, there are savings of the screen space and moving time (distance) of the cursor pointer.

(5) The number of functions can be increased by a display method such as a method of sorting states of an icon by color.

(6) When the present invention is applied to the operation of the folders (directories) of an operating system, the major operations to be used in a computer can be greatly lightened.

BRIEF DESCRIPTION OF THE DRAWINGS

The objects and features of the present invention will become more apparent from consideration of the following detailed description taken in conjunction with the accompanying drawings in which:

FIG. 3 shows states represented by combinations of the pin main body and shadow in the icon utilization method of the present invention;

FIG. 4 shows the functions that are executed by the pin main body and the cursor pointer in the icon utilization method of the present invention;

FIG. 5 shows the functions that are executed by the pin main body and the cursor pointer in the icon utilization method of the present invention;

FIG. 12, which includes FIGS. 12A and 12B, is an explanatory diagram used for explaining an example of the number of icons that are displayed on the screen of a display in the icon utilization method of the present invention; and FIG. 13 shows images other than the pin that can be utilized as the icons of the present invention.

Figures 1, 2:
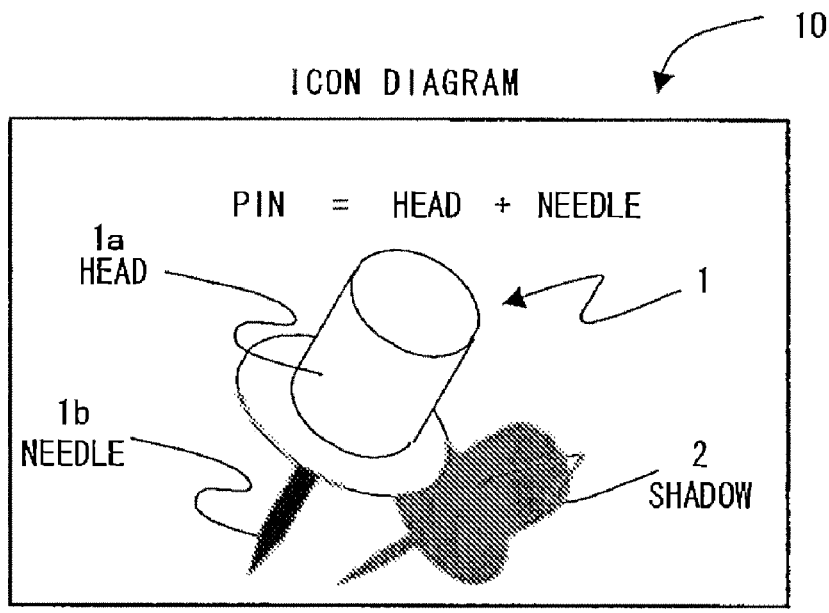
FIG. 1 is a perspective view showing an example of an icon in an icon utilization method of the present invention.
FIG. 2 shows the states of a pin main body and its shadow in the icon utilization method of the present invention.

DESCRIPTION OF THE NUMERALS 1 main body
1a head
1b needle
2 shadow
10 icon
21 icon shadow image
22 entire icon image
23 button storage image
24 target object display image
25 target object display enlargement-reduction

DESCRIPTION OF THE PREFERRED EMBODIMENTS

A preferred embodiment of an icon utilization method, an icon utilization system, an icon utilization control program, and a program storage medium according to the present invention will hereinafter be described in detail with reference to the accompanying drawings In the following description, the icon utilization method according to the present invention will be described, but if the icon utilization method is incorporated into an apparatus, it may be carried out as an icon utilization apparatus Likewise, the icon utilization method may be carried out as an icon utilization control program executable by a computer, or the icon utilization control program may be stored on a program storage medium readable by a computer.

Prior to the description of the preferred embodiment of the present invention, the basic constitution of the present invention will be described briefly. The present invention adopts a pushpin as an icon for a man-machine interface, thereby making the enlargement-reduction operation of the movement, fixation, and display of a target object easier to intuitively understand.

The present invention adopts a pushpin comprising a plurality of constituent parts as an icon, thereby being able to express a plurality of functions in a form easy to intuitively understand with a single icon Accordingly, users can select necessary functions without display of the function names and perform an operation with the minimum movement of a cursor pointer. Furthermore, by sorting icons by color, it is possible to give them a variety of functions.

A preferred embodiment of the present invention uses as a man-machine interface means an icon adopting a pushpin shown below. In the following description, the parts of the icon are given names shown in FIG. 1. The figure is a schematic diagram showing an example of an icon used in the icon utilization method of the present invention and shows names given to the constituent parts of the icon.

As shown in FIG. 1, the icon 10 in the icon utilization method of the present invention is constructed as a pushpin and comprises a pin main body 1 and a shadow 2 relating to the pin main body 1. The pin main body 1 is constituted by a cylindrical head 1a and a needle 1b.

In the preferred embodiment, the pin main body 1 and shadow 2 are assigned states such as those shown in FIG. 2.

As shown in FIG. 2, the pin main body 1 is assigned a floating state, a halfway sticking state, a halfway sticking and rotating state, and a deeply sticking state. On the other hand, the shadow 2 relating to the pin main body 1 is assigned a floating state, a halfway sticking state, a deeply sticking state, and a hidden-button displaying state.

Now, FIG. 3 shows states that a system utilizing the present invention assumes in accordance with combinations of the pin main body 1 and the shadow 2.

As shown in FIG. 3, in the state where the pin main body 1 is floating, the state of the shadow 2 is effective only when the shadow 2 is in the floating state. This case indicates that the pin main body 1 and a target object are in a movable state.

In the state in which the pin main body 1 is sticking halfway and fixing, the state of the shadow 2 is effective either when the shadow 2 is in the halfway sticking state, or when the shadow 2 displays hidden buttons. The former case indicates that the pin main body 1 and a target object are staying at the place, while the latter case indicates that the hidden buttons are displayed and in a selectable state.

In the state in which the pin main body 1 is sticking halfway and rotating, the state of the shadow 2 is effective only when the shadow 2 is in the halfway sticking state. The case indicates that a target object is in an enlarging or reducing state.

In the state in which the pin main body 1 is sticking deeply, the state of the shadow 2 is effective only when the shadow 2 is in the halfway sticking state. This case indicates that the display of a target object is being executed.

To realize the system states shown in FIG. 3, FIGS. 4 and 5 show processing contents that are to be executed by the combinations of the states of the pin main body 1 displayed on the screen and the cursor pointer operated by the user.

The cursor pointer operation that is performed by the user is effective either (1) when a decision button is depressed with the cursor pointer placed on the cylindrical head 1a of the pin main body 1; (2) when the decision button is depressed with the cursor pointer placed on the needle 1b of the pin main body 1; (3) when the decision button is released; (4) when the cursor pointer is moved; (5) when the decision button is depressed with the cursor pointer placed on the shadow 2 relating to the pin main body 1; or (6) the decision button is depressed when with the cursor pointer placed on a button hidden in the shadow 2 of the pin main body 1.

FIG. 4 shows functions that are executed by operating the cursor pointer when a target object is in a non-display state, while FIG. 5 shows functions that are executed by operating the cursor pointer when a target object is in a display state.

As shown in FIG. 4, in the case where a target object is in the display state, the state of the pin main body 1 is ineffective when the pin main body 1 is in the halfway sticking and rotating state, and when the pin main body 1 is in the state showing buttons hidden in the shadow of the pin. In the case where the pin main body 1 is in the floating state, the operation of the cursor pointer is effective either when the decision button is released, or when the cursor pointer is moved. The former operation causes the pin main body 1 to go from the floating state to the halfway sticking and fixing state, while the latter operation causes the display position of the pin main body 1 to move following the movement of the cursor point.

In the case where the pin main body 1 is in the halfway sticking and fixing state, the operation of the cursor pointer is effective either when the decision button is depressed with the cursor pointer placed on the cylindrical head 1a of the pin main body 1, or when the decision button is depressed with the cursor pointer placed on the needle 1b of the pin main body 1. The former operation causes the pin main body 1 to go from the halfway sticking and fixing state to the deeply sticking state, while the latter operation causes the pin main body 1 to go from the halfway sticking and fixing state to the floating state.

In the case where the pin main body 1 is in the deeply sticking state, the operation of the cursor pointer is effective only when the decision button is released. The pin main body 1 goes from the deeply sticking state to the halfway sticking and fixing state of FIG. 5, so that a target object is displayed on the screen.

On the other hand, as shown in FIG. 5, in the case where a target object is in the display state, the state of the pin main body 1 is ineffective when the pin main body 1 is in the deeply sticking state. In the case where the pin main body 1 is in the floating state, as with the case of the non-display state of FIG. 4, the operation of cursor pointer is effective either when the decision button is released or when the cursor pointer is moved. The former operation causes the pin main body 1 to go from the floating state to the halfway sticking and fixing state, while the latter operation causes the display position of the pin main body 1 to move following the movement of the cursor pointer.

In the case where the pin main body 1 is in the halfway sticking and fixing state, the operation of the cursor pointer is effective either (1) when the decision button is depressed with the cursor pointer placed on the cylindrical head 1a of the pin main body 1, (2) when the decision button is depressed with the cursor pointer placed on the needle 1b of the pin main body 1, or (3) when the decision button is depressed with the cursor pointer placed on the shadow 2 relating to the pin main body 1. The first operation causes the pin main body 1 to go from the halfway sticking and fixing state to the halfway sticking and rotating state, the second operation causes the pin main body 1 to go from the halfway sticking and fixing state to the floating state, and the third operation causes a selected button to be displayed within an enlarged shadow.

In the case where the pin main body 1 is in the halfway sticking and rotating state, the operation of the cursor pointer is effective either when the decision button is depressed with the cursor pointer placed on the cylindrical head 1a of the pin main body 1, or when the decision button is released. The former operation enlarges or reduces the display of a target object. (Note that when a display size reduced is less than a threshold value, a target object is caused to be in the non-display state and the pin main body 1 goes from the halfway sticking and rotating state to the halfway sticking and fixing state of FIG. 4.) On the other hand, the latter operation decides enlargement or reduction through a toggle switch and causes the pin main body 1 to go from the halfway sticking and rotating state to the halfway sticking and fixing state.

In the case where the pin main body 1 is in the hidden-button displaying state, the operation of the cursor pointer is effective either when the decision button is depressed with the cursor pointer placed on the shadow 2 relating to the pin main body 1, or when the decision button is depressed with the cursor pointer placed on a button being within the shadow 2. The former operation reduces the shadow 2 so that selection buttons within the shadow are in the non-display state, while the latter operation carries out a function assigned to the selected button.

The functions that are executed by the operation of the cursor pointer shown in FIGS. 4 and 5 will be further described by employing state transition diagrams shown in FIGS. 6 through 10. Based on such state transition diagrams, technicians proficient in software methods are able to easily and accurately make an icon utilization control program that realizes functions utilizing the icon comprising the pin main body 1 and shadow 2.

Figure 6:
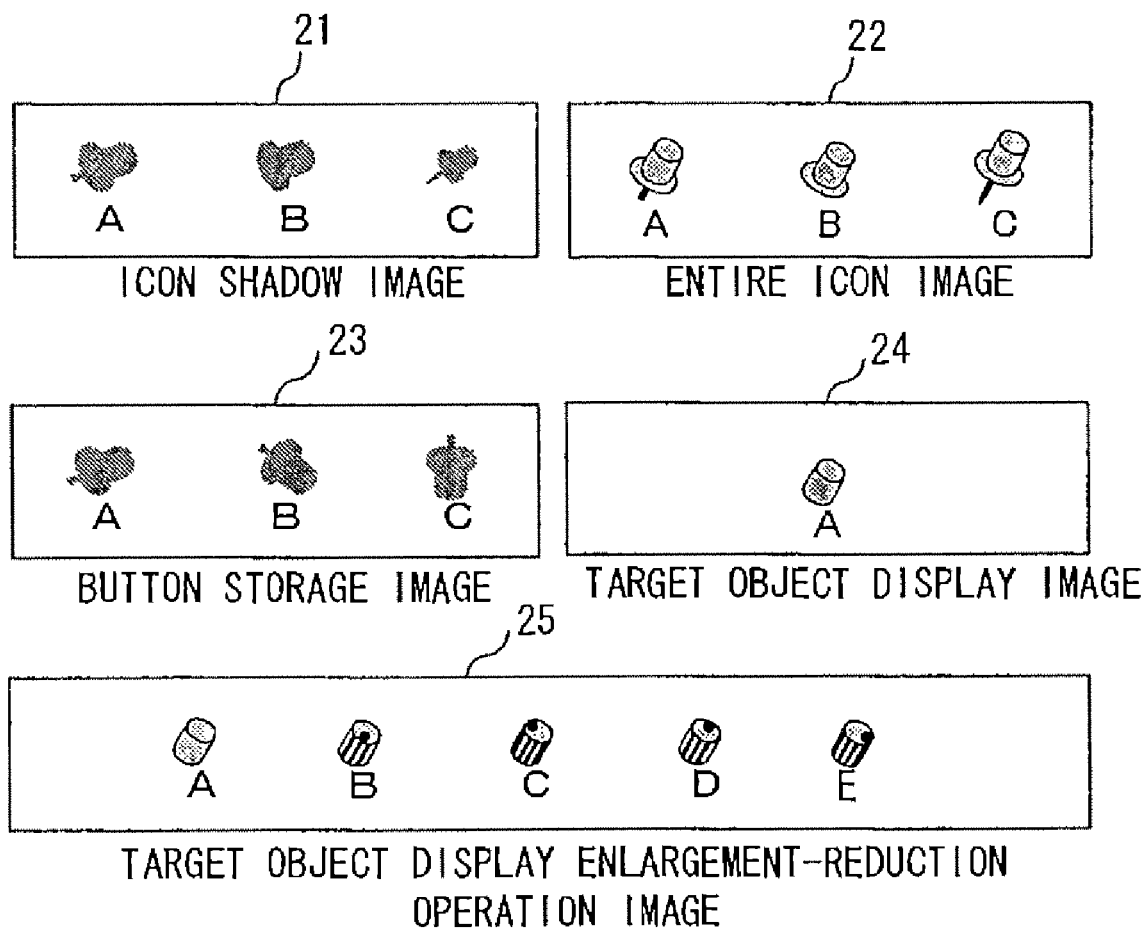
FIG. 6 is an explanatory diagram used for explaining icons displayed as images on state transition diagrams in a preferred embodiment of the present invention.

FIG. 6 is an explanatory diagram used for explaining icons displayed as images on the state transition diagrams of FIGS. 7 through 10, while FIGS. 7 through 10 are state transition diagrams showing an example of the transition conditions of a state in the icon utilization method of the present invention.

As shown in FIG. 6, as icon images shown on the state transition diagrams of FIGS. 7 through 10, three different icon shadow images 21 indicating three states of the shadow 2, three different entire icon images 22 indicating three states of the pin main body 1, three different button storage images 23 indicating three stored states of the button, a target object display image 24 indicating the cylindrical head 1a at the time of the non-display of a target object, and five different target object display enlargement-reduction operation images 25 indicating the enlargement and reduction operations of the display sizes of the cylindrical head 1a and a target object at the time of the display of the target object are shown in accordance with respective states. For the icon shadow images 21 and entire icon images 22, three different states A (halfway sticking state), B (deeply sticking state), and C (floating state) are prepared. For the button storage images 23, three different states A, B, and C are prepared for switching the display and non-display of hidden buttons. For the target object display image 24, only one state A is prepared. For the target object display enlargement-reduction operation images 25, five different states A (indicating that a target object is not in the enlarging-reducing state), and B, C, D, E (indicating that the pin main body 1 in the enlarging-reducing state is rotating) are prepared. Since the images shown in FIG. 6 function as triggers for the occurrence of each of events a, b, c, d, e, f, and g, they are shown on this side in the order of icon shadow image 21, button storage image 23, entire icon image 22, target object display image 24, and target object display enlargement-reduction operation image 25 from the depth.

Events a, b, c, d, e, f, and g in the state transition diagrams of FIGS. 7 through 10 indicate the operation of the cursor pointer, or a state transition condition due to the state of the result of a cursor pointer operation. They are as follows:

(a) Event a: With the cursor pointer placed on the upper portion (cylindrical head 1a) of the icon, the decision button is depressed.

(b) Event b: The display size of a target object is less than a predetermined threshold value.

(c) Event c: With the cursor pointer placed on the lower portion (needle 1b) of the icon, the decision button is depressed.

(d) Event d: The decision button is released.

(e) Event e: With the cursor pointer placed on the shadow 2 of the icon, the decision button is depressed.

(f) Event f: With the cursor pointer placed on the button of the shadow 2 of the icon, the decision button is depressed.

(g) Event g: The cursor pointer is moved.

Figure 7:
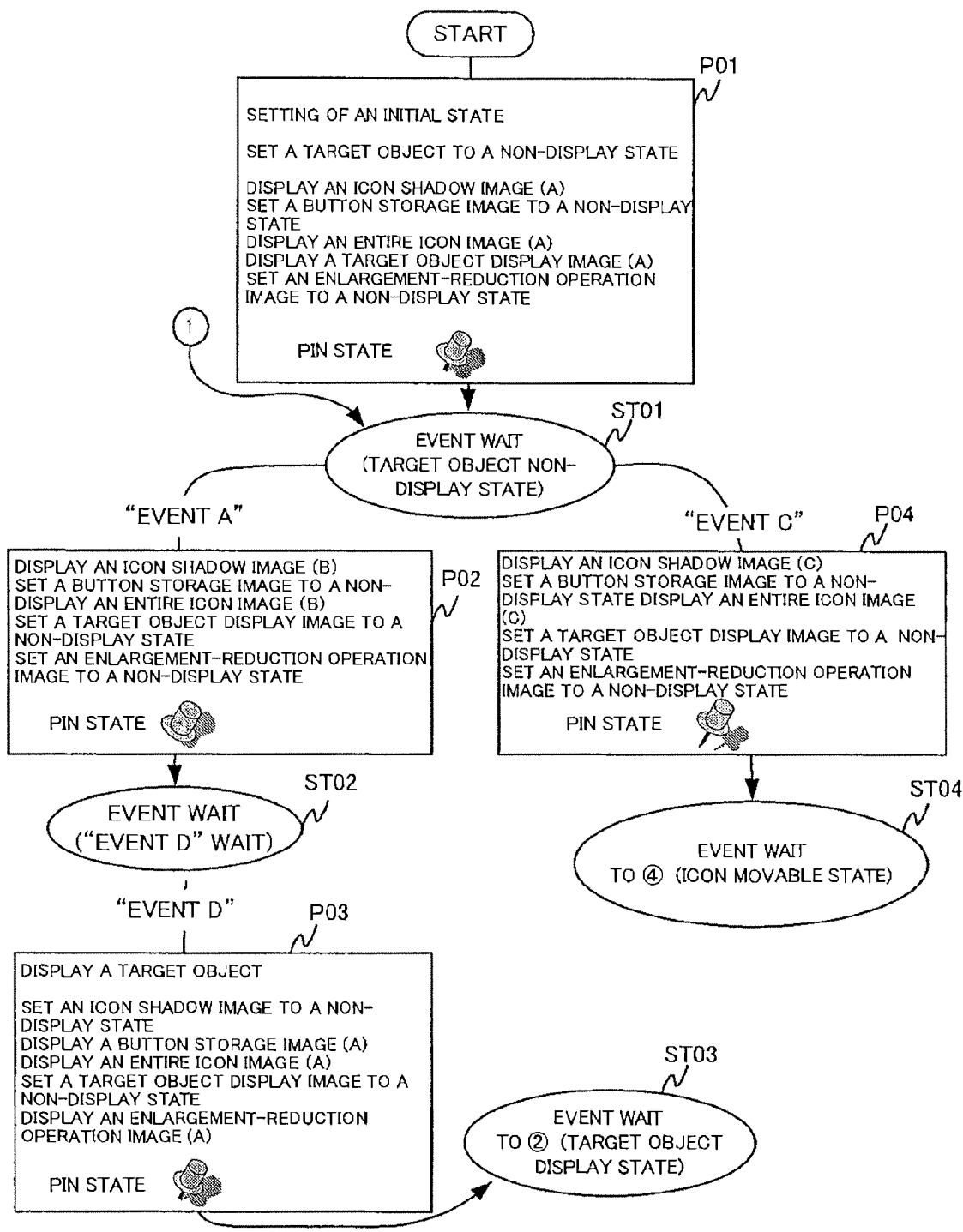
FIG. 7 is a state transition diagram of a target object non-display state in the icon utilization method of the present invention.

In the state in which the icon can be utilized, the state transition of FIG. 7 is stared and the setting of an initial state is performed (process P01). After a target object has been set to a non-display state to return it to its initial state, the entire icon image 22(A) and icon shadow image 21(A) are displayed as the halfway sticking state. In addition, the target object display image 24(A) is displayed and the button storage image 23 and the target object display enlargement-reduction operation image 25 are set to a non-display state. Thereafter, the processing makes a transition to a target object non-display state and waits for the event to occur (state ST01).

In state ST01, when event a (in which the decision button is depressed with the cursor pointer placed on the cylindrical head 1a (target object display image 24)) occurs, the entire icon image 22(A) is changed to the entire icon image 22(B) as the deeply sticking state. Similarly, the icon shadow image 21(A) is changed to the icon shadow image 21(B). Further, the target object display image 24 is set to a non-display state, and the button storage image 23 and the target object display enlargement-reduction operation image 25 remain set to a non-display state (process P02). Thereafter, the processing makes a transition to a state which waits for event d (in which the decision button is released), and waits for the next event to occur (state ST02).

In state ST02, when event d (in which the decision button is released) occurs, a target object is displayed as if the pin main body has stuck in the upper portion of the target object. Then, to set the pin main body to the halfway sticking and fixing state, the entire icon image 22(B) is changed to entire icon image 22(A), and the target object display enlargement-reduction operation image 25(A) is displayed. Further, the button storage image 23(A) is displayed, the icon shadow image 21 is set to a non-display state, and the target object display image 24 remains set to a non-display state (process P03). Thereafter, the processing makes a transition to a target object display state and waits for the next event to occur (state ST03).

On the other hand, in state ST01, when event c (in which the decision button is depressed with the cursor pointer placed on the needle 1b (entire icon image 22)) occurs, the entire icon image 22(A) is changed to the entire icon image 22(C) as the floating state. Similarly, the icon shadow image 21(A) is changed to the icon shadow image 21(C) and displayed. Further, the target object display image 24 is set to a non-display state, and the button storage image 23 and the target object display enlargement-reduction operation image 25 remain set to a non-display state (process P04). Thereafter, the processing makes a transition to an icon movable state and waits for the next event to occur (state ST04).

Figure 8:
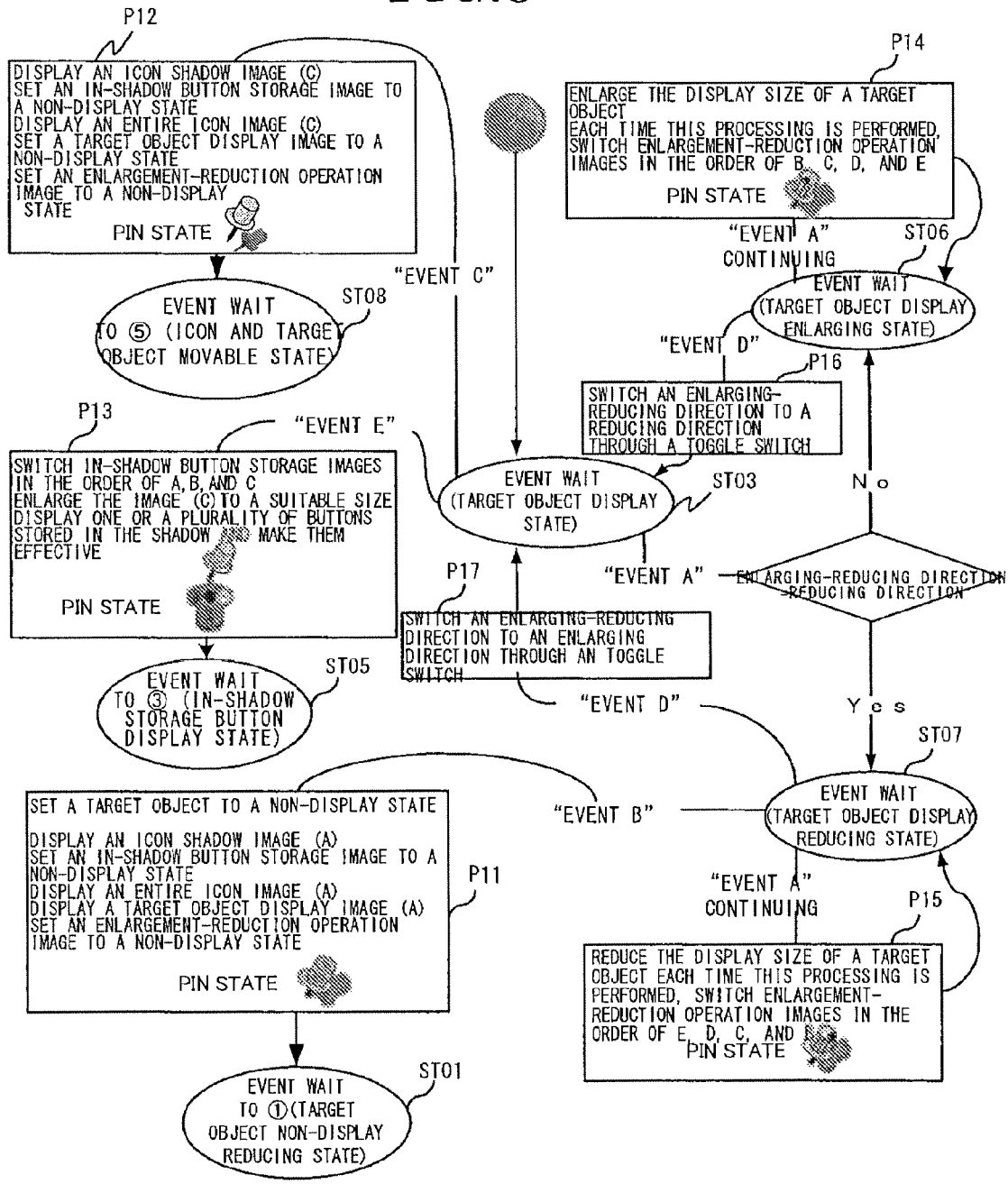
FIG. 8 is a state transition diagram of a target object display state in the icon utilization method of the present invention.

In the halfway sticking and fixing state, and in the target object display state ST03 shown in FIG. 8, when event a (in which the decision button is depressed with the cursor pointer placed on the cylindrical head 1a (target object display enlargement-reduction operation image 25)) occurs and when the display size enlarging-reducing direction of a target object is not the reducing direction, the processing makes a transition to a target object display enlarging state and waits for the next event to occur (state ST06). In state ST06, when event a (in which the decision button is depressed with the cursor pointer placed on the cylindrical head 1a (target object display enlargement-reduction operation image 25)) continues to occur, a selection to enlarge the display size of a target object is made, and each time this processing is performed, the target object display enlargement-reduction operation images 25(B), (C), (D), and (E) are switched and displayed in the recited order (process P14). In state ST06, when event d (in which the decision button is released) occurs, the display size enlarging-reducing direction of a target object is switched over to the reducing direction through a toggle switch (process P16). Thereafter, the processing returns to the target object display state ST03.

In state ST03, when event a (in which the decision button is depressed with the cursor pointer placed on the cylindrical head 1a (target object display enlargement-reduction operation image 25)) occurs and when the display size enlarging-reduction direction of a target object is the reducing direction, the processing makes a transition to a target object display reducing state and waits for the next event to occur (state ST07). In state ST07, when event a (in which the decision button is depressed with the cursor pointer placed on the cylindrical head 1a (target object display enlargement-reduction operation image 25)) continues to occur, a selection to reduce the display size of a target object is made, and each time this processing is performed, the target object display enlargement-reduction operation images 25(E), (D), (C), and (B) are switched and displayed in the recited order (process P15). In state ST07, when event d (in which the decision button is released) occurs, the display size enlarging-reducing direction of a target object is switched over to the enlarging direction through a toggle switch (process P17). Thereafter, the processing returns to the target object display state ST03.

In state ST07, when event b (in which the display size of a target object is less than a predetermined threshold value) occurs, a target object is set to a non-display state. To set the icon to the halfway sticking and fixing state, the entire icon image 22(A) remains displayed and the icon shadow image 21(A) is displayed. Further, the target object display image 24(A) is displayed and the button storage image 23 and target object display enlargement-reduction operation image 25 are set to a non-display state (process P11). Thereafter, the processing returns to the target object non-display state ST01 and waits for the next event to occur.

In state ST03, when event c (in which the decision button is depressed with the cursor pointer placed on the needle 1b (entire icon image 22) occurs, the entire icon image 22(A) is changed to the entire icon image 22(C) to set the icon to the floating state, and the icon shadow image 21(C) is displayed. Further, the target object display image 24 remains set to a non-display state, and the button storage image 23 and the target object display enlargement-reduction operation image 25 are set to a non-display state (process P12). Thereafter, the processing makes a transition to an icon and target movable state ST08, and waits for the next event to occur.

In state ST03, when event e (in which the decision button is depressed with the cursor pointer placed on the shadow 2 of the icon (button storage image 23(A)) occurs, the button storage images 23 are switched in the order of (A), (B), and (C), the button storage image 23(C) is enlarged and displayed to an optimum size, and one or a plurality of buttons stored with the shadow are displayed and made effective (process P13). Thereafter, the processing makes a transition to an in-shadow storage button display state and waits for the next event to occur (state ST05).

Figure 9:
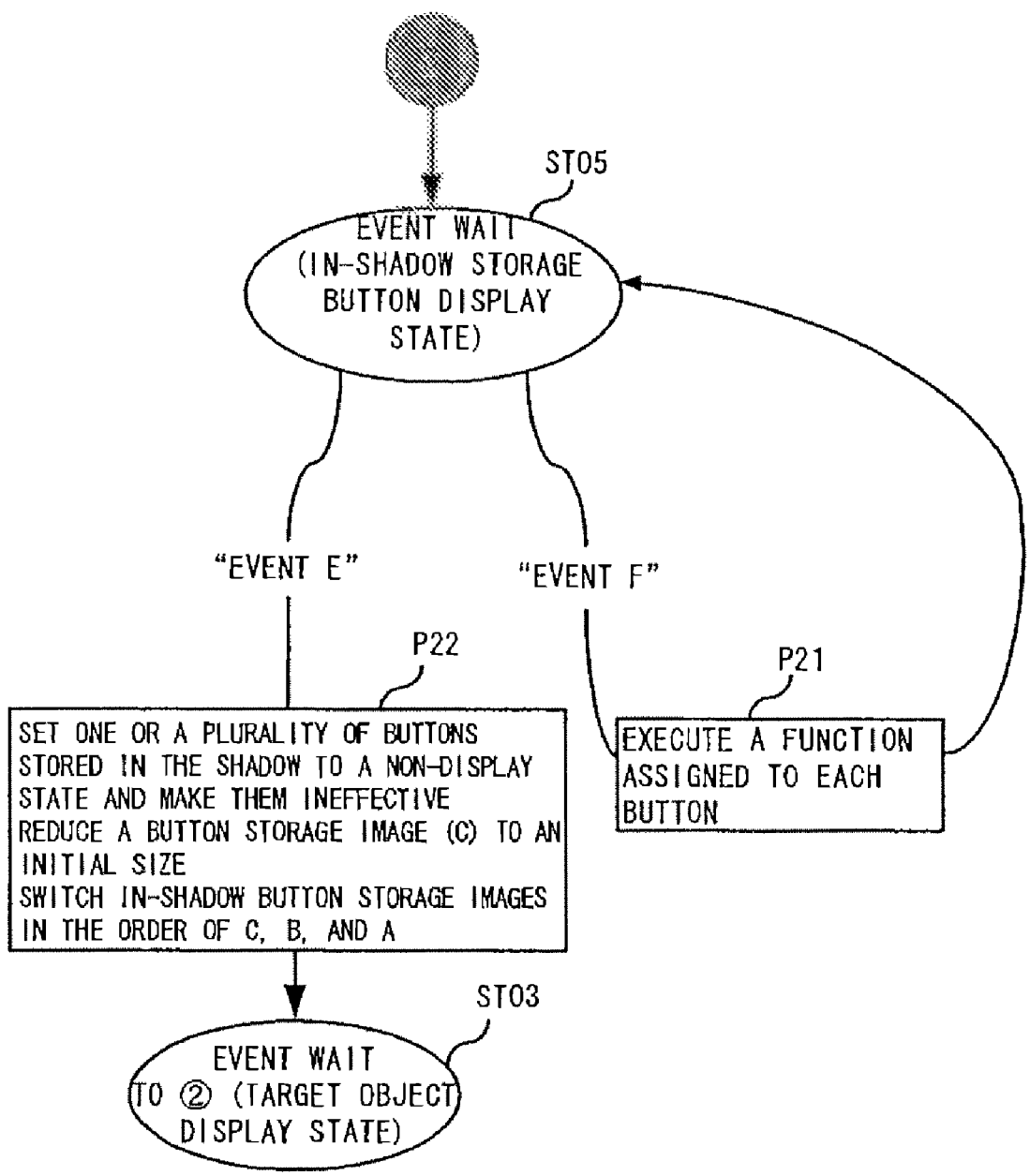
FIG. 9 is a state transition diagram of an in-shadow storage button display state in the icon utilization method of the present invention.

Next, in the halfway sticking and fixing state, and in the in-shadow storage button display state ST05 shown in FIG. 9, when event f (in which the decision button is depressed with the cursor pointer placed on the button of the shadow 2 of the icon) occurs, a function assigned to the button on which the cursor pointer was placed is carried out (process P21). Thereafter, the processing returns to in-shadow storage button display state ST05.

In state ST05, when event e (in which the decision button is depressed with the cursor pointer placed on the shadow 2 of the icon (button storage image 23(C)) occurs, one or a plurality of buttons stored with the shadow are set to a non-display state and made ineffective, the button storage image 23(C) is reduced to the initial size, and the button storage images 23 are switched in the order of (C), (B), and (A) (process P22). Thereafter, the processing returns to target object display state ST03 and waits for the next event to occur.

Figure 10:
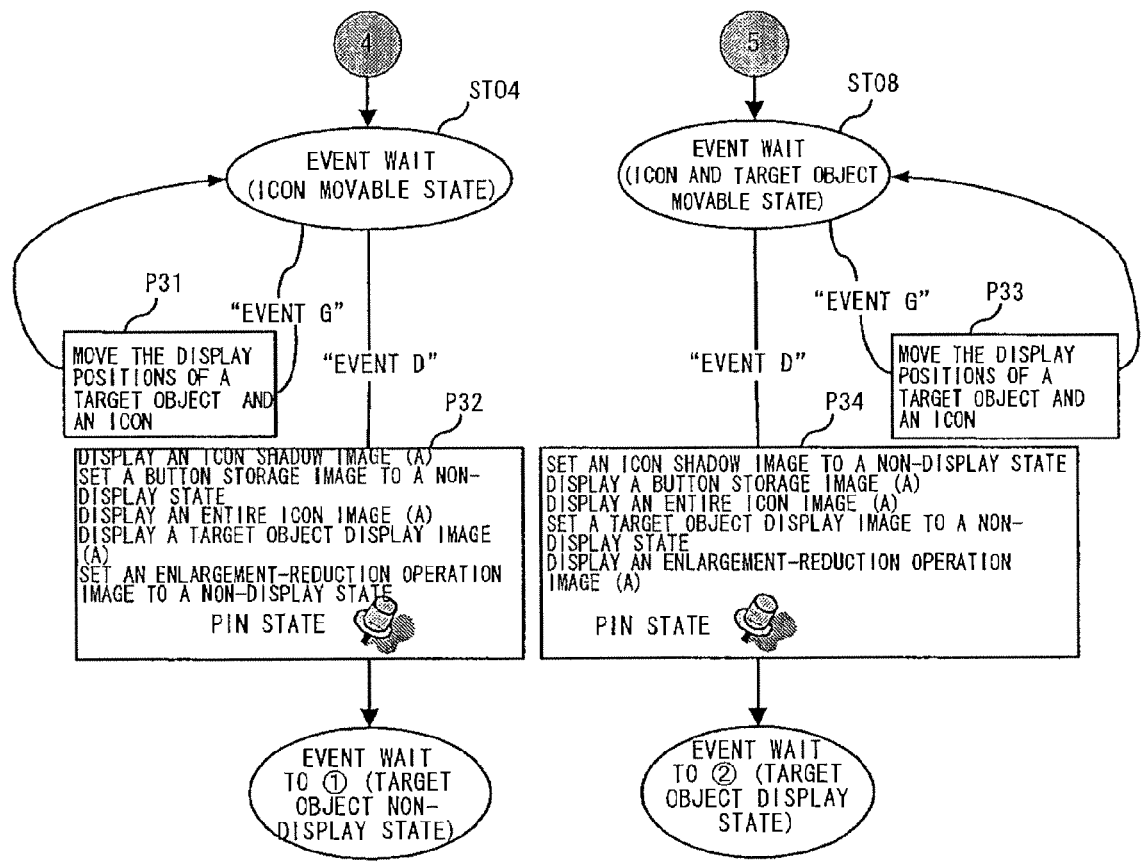
FIG. 10 is a transition diagram of an icon and target object movable state in the icon utilization method of the present invention.

Next, in icon and target movable states ST04 and ST08 of FIG. 10, when event g (in which the cursor pointer is moved) occurs, the display positions of a target object and an icon are moved following the movement of the cursor pointer (processes P31 and P33), and the processing returns to icon movable state ST04 or icon and target object movable state ST08.

In state ST04, when event d (in which the decision button is released) occurs, to set the icon to the halfway sticking and fixing state, the entire icon image 22(c) is changed to the entire icon image 22(A), and the icon shadow image 21(C) is changed to the icon shadow image 21(A) and displayed. Further, the target object display image 24(A) is displayed and the button storage image 23 and the target object display enlargement-reduction operation image 25 remains set to a non-display state (process P32). Thereafter, the processing returns to target object non-display state ST01 and waits for the next event to occur.

In state ST08, when event d (in which the decision button is released) occurs, to set the icon to the halfway sticking and fixing state, the entire icon image 22(c) is changed to the entire icon image 22(A), and the target object display enlargement-reduction operation image 25(A) is displayed. Further, the button storage image 23(A) is displayed, the icon shadow image 21 is set to a non-display state, and the target object display image 24 remains set to a non-display state (process P34). Thereafter, the processing returns to target object display state ST03 and waits for the next event to occur.

Now, advantages of the preferred embodiment of the icon utilization method of the present invention described above will be described compared with a conventional icon utilization method.

Figure 11:
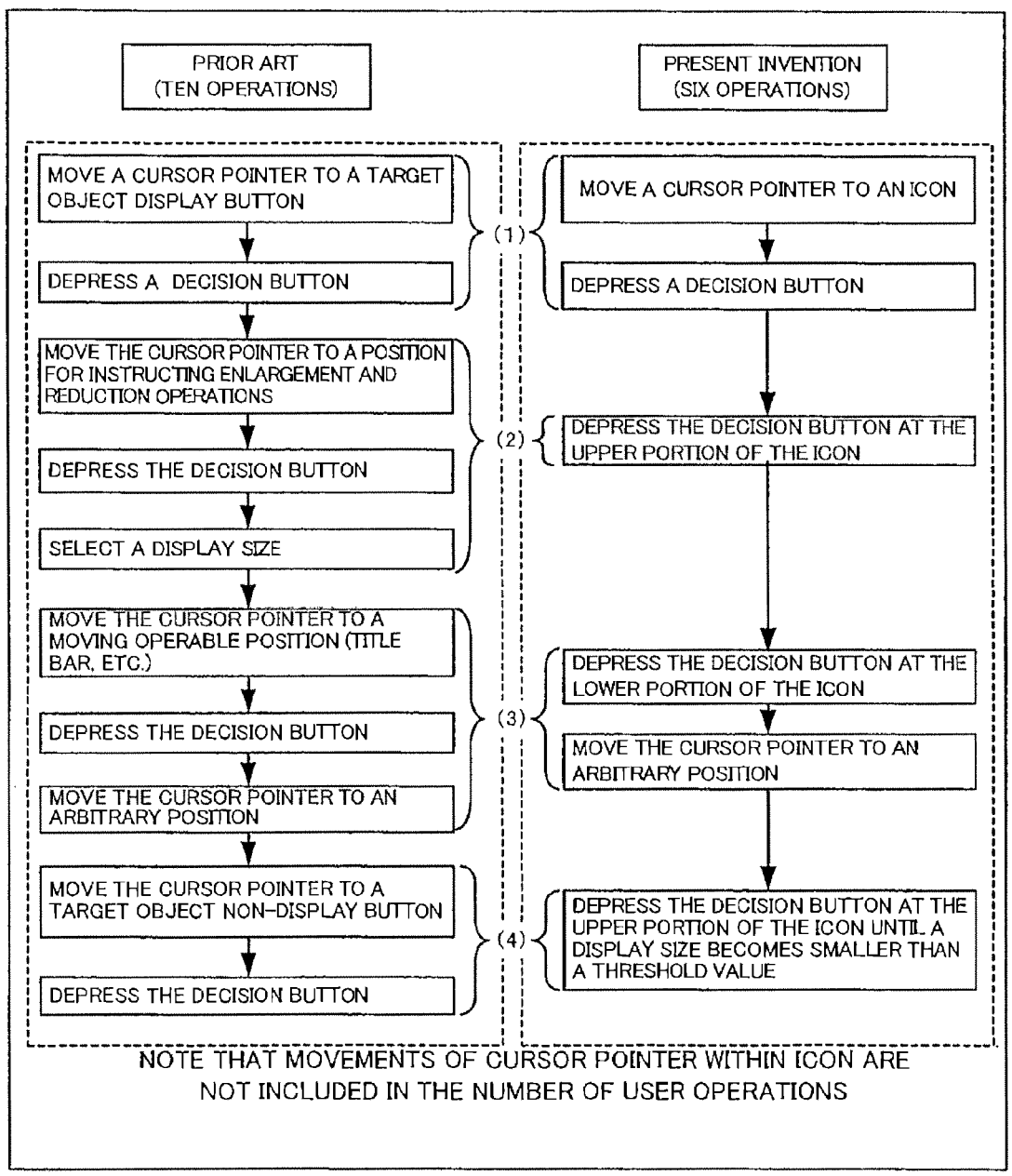
FIG. 11 is an explanatory diagram used for explaining an example of the number of user operations of the icon utilization method of the present invention.

First, employing FIG. 11, the number of user operations in the icon utilization method of the present embodiment will be described compared with prior art. FIG. 11 is an explanatory diagram used for explaining an example of the number of user operations in the icon utilization method of the present invention, the number of user operations being compared with prior art. Note that the number of user operations shown in FIG. 11 is shown in the case where the following four operations are successively performed, but movements of the cursor pointer within an icon are not counted as the number of operations.

Operation (1): Display of a target object
Operation (2): Movement of a target object
Operation (3): Change of the display size of a target object
Operation (4): Non-display of a target object As shown in FIG. 11, for operation (1) for displaying a target object, the cursor pointer is moved to an icon comprising a pushpin and then the decision button is depressed. Thus, two operations are required and are the same number of operations as prior art. However, in the case of operation (2) for moving a target object, a single operation is required in which the cursor pointer within an icon is moved to the cylindrical head 1a and then the decision button is depressed. The case of the prior art requires three operations.

Further, in operation (3) for changing the display size of a target object, the cursor pointer within the icon is moved to the needle 1b, then the decision button is depressed, and the cursor pointer is moved to an arbitrary place. Thus, operation (3) requires two operations, while the prior art requires three operations. In operation (4) for setting a target object to a non-display state, the cursor pointer is moved to the cylindrical head 1a, and the decision button is depressed until the display size becomes smaller than a predetermined threshold value. Thus, operation (4) requires a single operation, while the prior art requires two operations.

Therefore, in the case where the aforementioned four operations are successively performed, the number of user operations in the preferred embodiment of the present invention can be reduced to about half (six operations) compared with 10 operations of the prior art. Thus, user operability can be greatly improved.

Next, employing FIG. 12, the number of icons displayed on the display screen in the icon utilization method of the present embodiment will be described compared with prior art.

FIG. 12 is an explanatory diagram used for explaining an example of the number of icons displayed on the display screen of the icon utilization method of the present invention. FIG. 12A shows the number of icons in the case of prior art, while FIG. 12B shows the number of icons in the case of the present invention.

In prior art, as shown in FIG. 12A, in addition to a button representing a target object, operations relating to the movement, enlargement-reduction, and non-display of the target object are performed by a plurality of icons disposed within the window displaying the target object. Since it is necessary to display icons so as to correspond to the functions relating to such operations, the number of display icons is required by the number of functions.

In the icon utilization method of the present invention, as shown in FIG. 12B, an icon comprising a pushpin is assigned functions relating to the display, non-display, movement, and enlargement-reduction of a target object, so the number of display icons can be greatly reduced compared with the number of functions relating to such operations. As a result, the screen of a display can be effectively utilized. Even in the case of a small display screen such as the display screen of a cellular phone, the icon utilization method of the present invention is able to provide screen display which makes visual recognition easier and is easy to intuitively understand and good in operability.

While the present invention has been described with reference to the preferred embodiments thereof, the invention is not to be limited to the details given herein, but may be modified within the scope of the invention hereinafter claimed.

For example, the present invention is capable of obtaining the same advantages, employing icons expressed in display states different from a particular shape such as a screw, an airplane, a balloon, a sucking disk with a bulging central portion, and a golf ball, instead of the pin in the above embodiment.

FIG. 13 shows the corresponding relationship between the states of the pin described above and the respective states of a screw, an airplane, a balloon, a sucking disk with a bulging central portion, and a golf ball.

In FIG. 13, the "come out," "stick," "stick deeply," "rotate," and "shadow" of the pin correspond to the "come out," "stick," "stick deeply," "rotate," and "shadow" of a screw, and correspond to "fly," "land," "explode," "revolve," and "shadow" of an airplane.

In addition, the "come out," "stick," "stick deeply," "rotate," and "shadow" of the pin correspond to the "float," "land," "deflate," "revolve," and "shadow" of a balloon.

Furthermore, the "come out," "stick," "stick deeply," "rotate," and "shadow" of the pin correspond to the "fall out," "adhere," "cave in," "rotate," and "shadow" of a sucking disk with a bulging central portion, and correspond to the "come out," "stick," "stick deeply," "rotate," and "shadow" of the pin correspond to the "float," "land," "sink," "rotate," and "shadow" of a golf ball. Thus, the present invention can employ arbitrary icons expressed in display states differing from a particular shape.

What is claimed is:
1. A method of utilizing an icon representing a target object to display and control said target object on a display screen, comprising the steps of:

constituting said icon by displaying on the display screen a pin main body, which comprises a head and a needle, and a shadow of said pin main body; and changing the display and control of said target object represented by said icon by changing display states on the display screen of said pin main body and said shadow;

wherein when said target object is displayed on said display screen and is in an unexecuted state, said needle of said icon is displayed so that said needle has stuck halfway;

wherein when said target object is being executed, said needle of said icon is displayed so that said needle has stuck to a depth greater than halfway;

wherein when said target object and said icon are in a movable state, said needle of said icon is displayed so that said needle is floating;

wherein when said target object is in an enlargeable or reducible state, said head of said icon is displayed so that said head is rotating.

2. The method as set forth in claim 1, wherein, when said target object is in a non-display state on said display screen, said target object is displayed on said display screen by depressing a decision button with a cursor pointer placed on the head of said pin main body of said icon, and then releasing said decision button.

3. The method as set forth in claim 1, wherein, when said target object is in a display state or non-display state on said display screen, a display position of said target object and/or a display position of said icon is moved to an arbitrary position by depressing and dragging a decision button to said arbitrary position with a cursor pointer placed on the needle of said pin main body of said icon, and then releasing said decision button.

4. The method as set forth in claim 1, wherein, when said target object is in a display state on said display screen, a screen display size of said target object is enlarged or reduced by depressing a decision button with a cursor pointer placed on the head of said pin main body of said icon, and then the screen display size of said target object is decided by releasing said decision button with said cursor pointer placed on the head of said pin main body.

5. The method as set forth in claim 1, wherein, when said target object is in a display state on said display screen, enlargement and reduction of a screen display size of said target object are switched alternately by releasing a decision button with a cursor pointer placed on the head of said pin main body of said icon.

6. The method as set forth in claim 1, wherein, when said target object is in a display state on said display screen, said target object is set to a non-display state when a screen display size of said target object is reduced to a size smaller than a predetermined threshold value.

7. The method as set forth in claim 1, wherein, when said target object is in a display state on said display screen, a size of said shadow is enlarged to a suitable display size by depressing a decision button with a cursor pointer placed on said shadow of said icon, whereby one or a plurality of buttons stored within said shadow are displayed within said shadow and made effective.

8. The method as set forth in claim 7, wherein, when said target object is in a display state on said display screen, and said one or plurality of buttons are displayed within said shadow and made effective, the decision button is depressed with the cursor pointer placed on any of said one or plurality of buttons, whereby a function corresponding to the button selected is carried out.

9. The method as set forth in claim 8, wherein, when said target object is in a display state on said display screen, and said one or plurality of buttons are displayed within said shadow and made effective, the decision button is depressed with the cursor pointer placed on said shadow of said icon, whereby said one or plurality of buttons displayed within said shadow are switched over to a non-display state and made ineffective, and a display size of said shadow is reduced to an initial display size.

10. The method as set forth in claim 7, wherein, when said target object is in a display state on said display screen, and said one or plurality of buttons are displayed within said shadow and made effective, the decision button is depressed with the cursor pointer placed on said shadow of said icon, whereby said one or plurality of buttons displayed within said shadow are switched over to a non-display state and made ineffective, and a display size of said shadow is reduced to an initial display size.

11. The method as set forth in claim 1, wherein, when said target object is in a display state on said display screen, a screen display size of said target object is enlarged or reduced by depressing a decision button with a cursor pointer placed on the head of said pin main body of said icon, and then the screen display size of said target object is decided by releasing said decision button without dragging the cursor pointer to another position.

12. The method as set forth in claim 1, wherein, when said target object is in a display state on said display screen, enlargement and reduction of a screen display size of said target object are switched alternately by depressing and releasing a decision button with a cursor pointer placed on the head of said pin main body of said icon without dragging the cursor pointer to another position.

13. A computer readable storage medium storing a program for carrying out by a computer the method as set forth in claim 1.

14. An apparatus for utilizing an icon representing a target object to display and control said target object on a display screen, comprising a hardware structure, wherein said icon is constituted by displaying on the display screen a pin main body, which comprises a head and a needle, and a shadow of said pin main body; and the display and control of said target object represented by said icon are changed by changing display states on the display screen of said pin main body and said shadow;

wherein when said target object is displayed on said display screen and is in an unexecuted state, said needle of said icon is displayed so that said needle has stuck halfway;

wherein when said target object is being executed, said needle of said icon is displayed so that said needle has stuck to a depth greater than halfway;

wherein when said target object and said icon are in a movable state, said needle of said icon is displayed so that said needle is floating;

wherein when said target object is in an enlargeable or reducible state, said head of said icon is displayed so that said head is rotating.

* * * * *